United States Patent
Pitot et al.

(10) Patent No.: US 6,519,655 B1
(45) Date of Patent: Feb. 11, 2003

(54) MESSAGE PREPROCESSING OPERATIONS INDICATED BY AN ASSOCIATED DESCRIPTOR READ AND DESCRIPTORS BELONGING TO A CATEGORY OF PREPROCESSING DESCRIPTORS AND A CATEGORY OF INSTRUCTION DESCRIPTORS

(75) Inventors: Christian Pitot, Boulogne Billancourt (FR); Gérard Colas, Versailles (FR)

(73) Assignee: Sextant Avionique, Velizy Villacoublay (FR)

( * ) Notice: Subject to any disclaimer, the term of this patent is extended or adjusted under 35 U.S.C. 154(b) by 0 days.

(21) Appl. No.: 09/463,213

(22) PCT Filed: Jul. 21, 1998

(86) PCT No.: PCT/FR98/01608
§ 371 (c)(1),
(2), (4) Date: Jan. 21, 2000

(87) PCT Pub. No.: WO99/05836
PCT Pub. Date: Feb. 4, 1999

(30) Foreign Application Priority Data

Jul. 22, 1997 (FR) .............................................. 97 09287

(51) Int. Cl.⁷ .......................... G06F 13/14; H04L 29/00
(52) U.S. Cl. .................. 710/5; 710/3; 710/4; 370/465; 370/471; 370/475
(58) Field of Search ................................ 370/465, 466, 370/471, 474, 475, 490; 709/200, 230, 245; 710/3–5, 100, 305

(56) References Cited

U.S. PATENT DOCUMENTS

| | | | | |
|---|---|---|---|---|
| 5,287,444 A | * | 2/1994 | Enescu et al. | 704/7 |
| 5,339,434 A | * | 8/1994 | Rusis | 709/228 |
| 5,457,800 A | * | 10/1995 | Howells et al. | 701/200 |
| 5,544,329 A | * | 8/1996 | Engel et al. | 710/5 |
| 5,893,911 A | * | 4/1999 | Piskiel et al. | 707/10 |
| 5,954,810 A | | 9/1999 | Toillon et al. | |

* cited by examiner

Primary Examiner—Jeffrey Gaffin
Assistant Examiner—Ilwoo Park
(74) Attorney, Agent, or Firm—Oblon, Spivak, McClelland, Maier & Neustadt, P.C.

(57) ABSTRACT

A method for the reception and preprocessing of digital messages, with a view to their use by a handling processor. The method associates a tag identifying each message capable of being received with a descriptor of preprocessing operations to be applied to the message. The tag of certain messages is associated with a sequence of descriptors of instructions capable of being run. The descriptor is stored in a memory at an address calculated with the aid of the tag of the associated message. Upon reception of a message, the tag of the received message is read, the address of the descriptor is determined with the aid of the tag, the descriptor is read at the address thus calculated, and the instruction sequence associated with the tag of the message is run if the descriptor is of the instruction type.

17 Claims, 4 Drawing Sheets

MESSAGE PREPROCESSING OPERATIONS INDICATED BY AN ASSOCIATED DESCRIPTOR READ AND DESCRIPTORS BELONGING TO A CATEGORY OF PREPROCESSING DESCRIPTORS AND A CATEGORY OF INSTRUCTION DESCRIPTORS

BACKGROUND OF THE INVENTION

1. Field of the Invention

The present invention relates to the reception and preprocessing of digital messages available on at least one reception channel of a digital bus with a view to their use by a handling processor.

2. Discussion of the Background

It applies in particular, but not exclusively, to digital transmissions via digital buses such as those which are encountered on board aircraft for interconnecting the various on-board electronics. In the scope of these digital transmissions, each equipment item connected to a digital bus needs to select, from the messages in transit on the bus, those which are intended for it and extract the useful information items from these messages. For this purpose, the equipment item comprises a hardware reception device capable of intercepting the messages travelling on the bus, identifying the useful messages from among the intercepted messages and putting the collected useful messages in a memory area accessible to its processing and computation components, these components being generally in the form of a processor driven by software.

In order to permit the selection of the messages in transit on a bus by the right equipment items, it is known to provide each message with a label or tag explicitly or implicitly giving its destination equipment item or items.

The tag explicitly gives the destination or destinations of the message when it is formed by one or more addresses of equipment on the bus. This explicit mode of addressing the messages at the drawback of requiring, in the equipment item giving rise to the transmission of a message, prior knowledge of the addresses on the bus of all the other equipment items liable to be concerned by the message.

In order to avoid this drawback, which makes it necessary to intervene on the equipment items already in place on a digital bus each time a new equipment item is added, it is preferable to indicate, in the label or tag of a message, its destination equipment item or items implicitly by using the tag or label as an identifier of the message. Each equipment item connected to the digital bus analyses the tags of the messages in transit on the digital bus in order to identify their nature and select those which concern them.

In the case in which the transmitted messages contain an identification tag, it is fairly common for this tag to describe not only the nature of the message but also the type of the first processing operation or preprocessing operation to be applied to the message upon its reception, in particular in order to modify the format under which it travels on the digital bus, which depends on the protocol adopted for the transmission, into a format assimilable by the processor of the destination equipment item. This is because the possible uses of a message are often well known to the equipment item which is sending them, and it is in this way possible to accompany the message by preprocessing directions which relieve the input circuits of the destination equipment items of decision-taking operations which are expensive in terms of computation time. All the more so since these preprocessing decisions need to be taken very early in a destination equipment item, at the interface which manages the protocol of the reception channel or channels of the transmission bus. The reason is that this interface is very often formed, for reasons of universality (possibilities of using the same equipment item with various sorts of digital buses employing varied protocols), by a specialized machine with low processing capacity.

Usually, when a message travelling on a digital bus contains an identification tag with a preprocessing direction, the information content of the tag corresponds to a preprocessing program identifier with an address of the identified preprocessing program in the program memory or memories of the destination equipment items, given explicitly or implicitly, and optionally parameters associated with the identified preprocessing function. When such a message, in transit on a digital bus, is observed by an equipment item, the latter identifies the identification tag and analyses its content in order to ascertain whether it corresponds to a locally available preprocessing program. If this is so, the equipment item in question will look for the relevant preprocessing program in its memory and runs it. If this is not so, the equipment item ignores the message and waits for the next one.

Many examples of transmission systems using messages with identification tags having a preprocessing direction are found in the prior art, such as, for example, those described in the American Patent U.S. Pat. No. 5,444,643, in the French Patent Application FR-A-2,724,742 or in the European Patent Applications EP-A-0 675 024 or EP-A-0 666 200.

The operations of preprocessing the messages reaching an equipment item via a reception channel of a digital bus are most of the time carried out by manipulating registers at the input of the equipment item, and the configuration of the registers which is best suited to the preprocessing of a message varies with the type of message. However, the transmission systems in the prior art at present, such as those disclosed by the documents above, prove to be fairly fixed in so far as they do not make it possible to modify with ease the configuration of a reception channel of the digital bus at the input of an equipment item. In fact, in order to modify this configuration, it is necessary to intervene on the equipment item itself, which in practice prohibits modifications during transmission of messages.

SUMMARY OF THE INVENTION

The object of the present invention is to overcome the above drawbacks and to allow dynamic modification of the configuration of a reception channel of a digital bus at the input of an equipment item.

For this purpose, it provides a method for the reception and preprocessing of digital messages available on at least one reception channel of a digital bus, with a view to their use by a handling processor for which the messages are intended, each message comprising useful information items and a tag identifying these useful information items.

This method comprises:

- the association of the tag of each message capable of being received with a descriptor relating to operations to be had carried out by a handling processor for which the message in question is intended,
- the storage of the descriptors in a memory at respective addresses calculated with the aid of the tags of the associated messages, and upon reception of a message, the reading of the tag of the received message, the calculation of the descriptor's address obtained with the aid of the tag, the reading in memory of the descriptor at the address thus calculated, and the running of the operations indicated by the descriptor.

According to the invention, the descriptors belong to various categories, including a category of preprocessing descriptors each containing all the parameters defining a preprocessing operation to be applied to the associated message, and a category of instruction descriptor corresponding to instructions to modify the control parameters of a reception channel, to an instruction for branching, conditional or unconditional, to another descriptor, to an instruction to compare the information items contained in the associated message with reference values or to an instruction to compare pointers for writing in data structures of the ring or frame type with reference values.

By virtue of these arrangements, the handling processor becomes entirely relieved of the selection of the operations of preprocessing the received messages, the definition of these operations being configurable and being capable of being modified dynamically by instruction sequences associated with certain messages, the running of which by a sequencer in charge of running the preprocessing operations is triggered by the reception of these messages. It is hence thus possible to produce operating modes which are more complex.

According to one feature of the invention, each sequence of instruction descriptors ends with a preprocessing descriptor.

According to another feature of the invention, each preprocessing descriptor comprises a memory address of a data block with predefined structure, in which the corresponding message is to be stored, this data block comprising a formatting information item defining more precisely the formatting operations to be applied to the message, so as to make the information items which it contains directly usable by a handling processor for which the message is intended, the application of the preprocessing operations defined by the message descriptor being followed by the application of the formatting operations to the useful information items of the message, and the storage of the information items thus formatted at predefined locations in the data block.

In this way, the message reception device is capable of relieving the handling processor of the sophisticated operations of formatting the received information items, and in an entirely configurable way by virtue of the use of a block of preloaded data comprising the precise definition of these formatting operations.

According to another feature of the invention, the handling processor is connected to a plurality of channels for transmitting digital messages, the method according to the invention furthermore comprising the association of each transmission channel with a channel control register indicating the address of the area containing the descriptors of the messages capable of being transmitted by this channel, as well as general parameters defining the preprocessing operations to be applied to these messages, the channel control registers being stored in memory at predefined respective addresses, the reception of a message by a channel triggering the reading of the control register of the channel, and the calculation of the address of the descriptor of the message with the aid of the tag of the message and the address of the area with the descriptors of the messages, which is read from the control register of the channel.

The invention also provides a device for carrying out the method according to the invention, this device comprising a sequencer machine designed to run the instruction sequences and the preprocessing operations on the received messages while taking into account the preprocessing parameters indicated by the corresponding descriptors.

BRIEF DESCRIPTION OF THE DRAWINGS

An embodiment of the device according to the invention will be described below, by way of nonlimiting example, with reference to the appended drawings in which.

DESCRIPTION OF THE PREFERRED EMBODIMENTS

Figure 1:
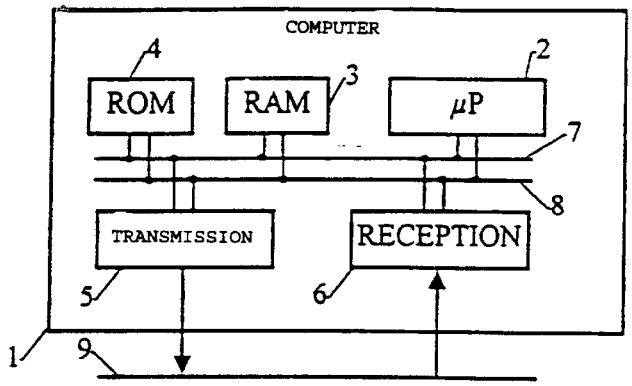
FIG. 1 diagrammatically represents a computer comprising a message reception device according to the invention connected to a digital-data transmission bus.

FIG. 1 represents a computer 1 comprising a microprocessor 2 connected via an address bus 7 and a data bus 8 to:

a volatile working memory 3, for example of the RAM type, a nonvolatile memory 4 in which, in particular, the program run by the microprocessor 2 is stored, a transmitting device 5 for sending data transmitted by the microprocessor 2 on an external bus 9 comprising n transmission channels, and a reception device 6 for transmitting the data travelling on the channels of the bus 9 to the microprocessor 2, in accordance with the method according to the invention.

The microprocessor 2 can thus communicate with other equipment items via the bus 9.

Figure 2:
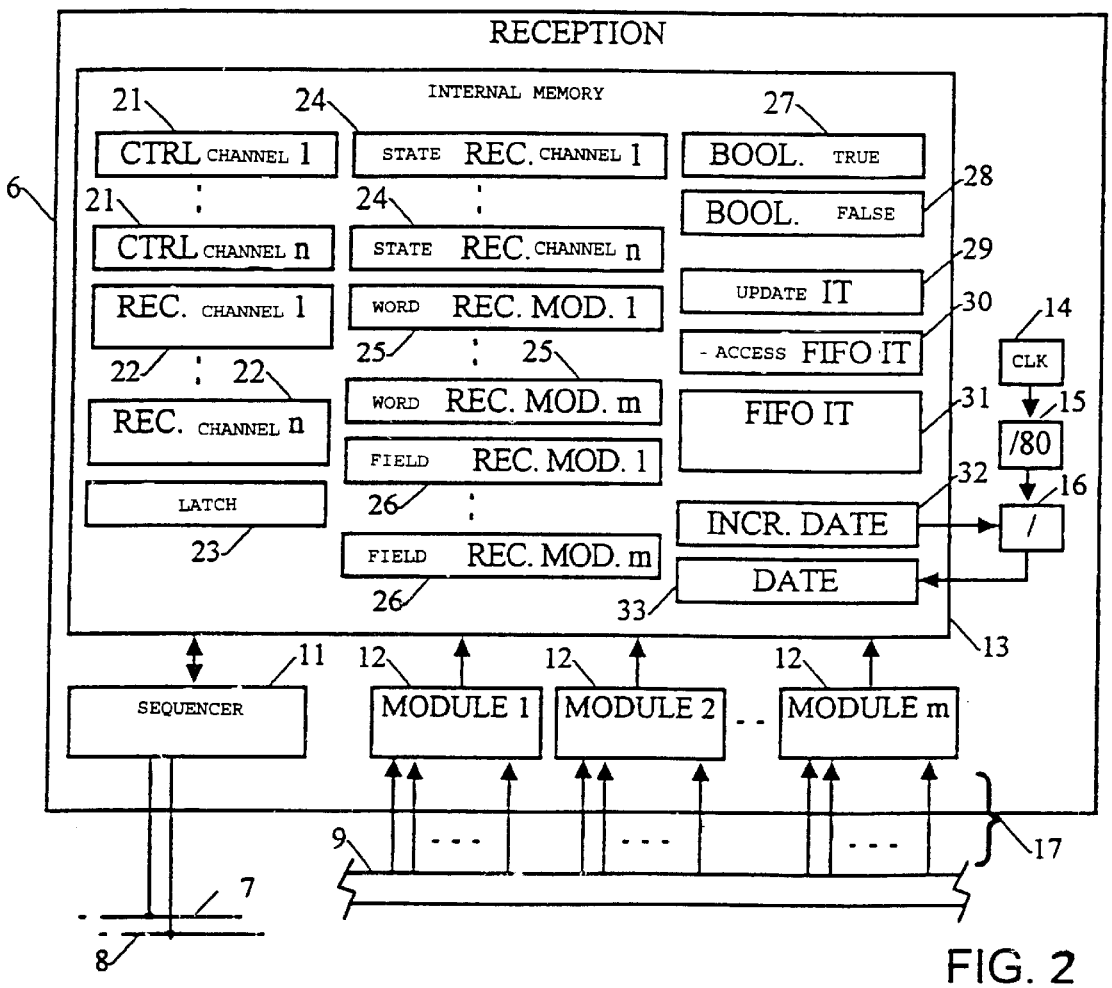
FIG. 2 is a detailed diagrammatic representation of the reception device shown in FIG. 1.

In FIG. 2, the reception device 6 comprises a sequencer machine 11, for example of the wired type, connected to the address 7 and data 8 buses of the microprocessor 2. The sequencer 11 is also connected to the bus 9 via m reception modules 12. As an example, the bus 9 combines 48 transmission channels 17, of the ARINC 429 type, each reception module 12, of which there are 6, receiving messages coming from 8 channels.

The reception device 6 furthermore comprises an internal memory 13 containing working registers used by the sequencer 11.

In particular, this internal memory 13 comprises, per transmission channel 17:

a channel control register 21, a channel reception register 22 comprising two fields used alternately, namely a first for storing the last complete message received by the reception module 12 corresponding to the channel, and a second field into which the following message coming from the same channel is being loaded bit by bit by the module, and a state register 24 for the channels, allowing the module corresponding to the channel to store the context of the transmission anomalies, such as template anomalies.

This memory 13 also comprises, for each reception module 12:

a register 25 in which the channels having a message available are signalled by a bit at 1, the correspondence between the number of the bit/channel being taken, for example, in increasing order of the significance of the bits and the numbers of channels of the module, and a register 26 indicating, for each channel controlled by the module, which field of the reception register 22 contains the last complete received message.

In order to make it possible to date the reception of the messages, the reception device 6 comprises a clock 14 whose output is connected to a first frequency divider 15 by 80, then to a second frequency divider 16 by a value provided by a date increment register 32, the output of the second divider 16 being sent to a register 33 permanently containing the current date.

The internal memory 13 also contains an interrupt waiting file, for example managed in FIFO (First In First Out) mode, in which the data characterizing the situations for which an interrupt is generated are stacked, so as to permit their processing by the microprocessor 2. However, the content of this waiting file is not accessible from outside the reception device 6, but can be read indirectly via an access register 30. In order to carry out a new operation of reading the waiting file, and therefore an update of the content of the register 30, it is sufficient to write a word having the low-significance bit at 1 to an unstacking request register 29. The register 30 is updated when the low-significance bit of the register 29 is at 0. These arrangements make it possible to withdraw from the file the interrupts which are taken into account by the microprocessor 2. Furthermore, write access to the waiting file 31 is also possible by writing to the register 30.

In order to carry out operations of formatting boolean variables transmitted in the received messages, the memory 13 also contains two registers 27, 28 parametrisably defining respectively the value of the boolean "TRUE", and that of the boolean "FALSE".

Figure 3:
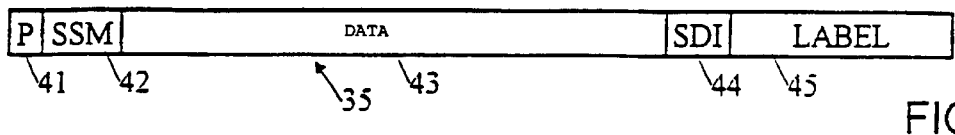
FIG. 3 shows the format of the received messages in accordance with the ARINC 429 standard.

The reception device 6 may, for example, be designed to receive messages according to the ARINC 429 standard. As represented in FIG. 3, the messages 35 of this type comprise, over 32 bits, a label or tag field 45 for identifying the message, a data field 43 containing the useful information of the message, a P field 41 which can be used so that the parity of the message is odd, an SSM field 42 sometimes used to indicate that the datum is invalid, and an SDI field 44 which can be used as an extension of the label field 45.

The reception modules 12 carry out, in particular, the demodulation and the serial/parallel conversion of the received messages, with template checking of the transmission signals. As the receptions take place, they update the registers 22, 24, 25 and 26, and when appropriate generate interrupts, writing the context of the interrupt to the waiting file 31 via the register 30.

Figure 4:
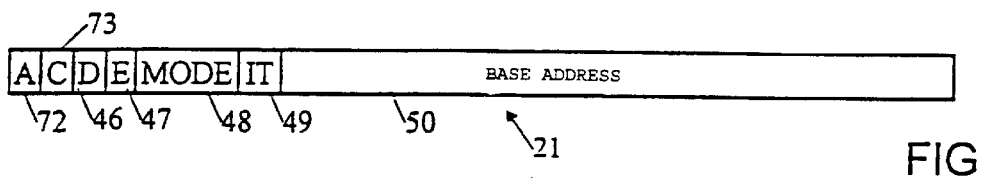
FIG. 4 shows the format of the content of a transmission channel control register belonging to the device shown in FIG. 2.
Figure 8:
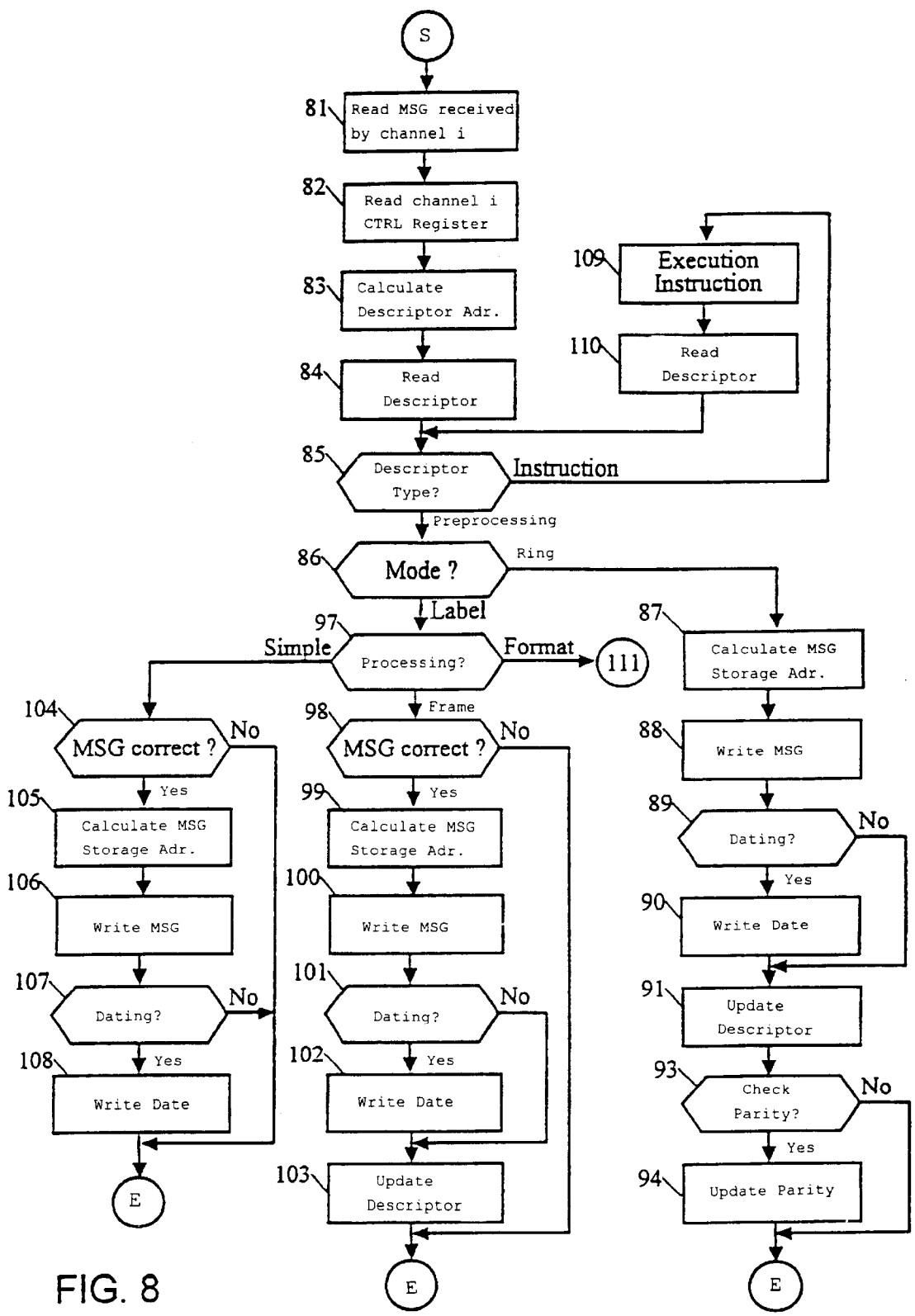
FIGS. 8 and 9 represent, in the form of flow charts, the algorithm run by the reception device shown in FIG. 2, in accordance with the method according to the invention.

When a received message is stored in a register 22, the sequencer machine 11 steps in to carry out more sophisticated processing operations on the message. For this purpose, the sequencer runs the algorithm represented in FIG. 8. It firstly starts (at stage 81) by reading the registers 24 and 25 which indicate the channels having transmitted a valid message. For each valid message received, it reads the register 26 to determine where the message is in the register 22 corresponding to the channel having transmitted the message, then it reads the message. In order to be able to determine the processing to be applied to the message, it is first necessary to read the control register 21 associated with the channel (stage 82). As represented in FIG. 4, this register comprises:

a field 50 giving the address of the memory area, located for example in the memories 3 or 4, containing the descriptors, that is to say the parameters describing the processing operations to be applied respectively to the messages transmitted by the channel, an IT field 49 for authorizing or not the generation of interrupts following events other than errors, a MODE field 48 indicating a mode of storage of the messages transmitted by the channel, an E field 47 for authorizing or not the generation of interrupts following format or parity errors, a D field 46 indicating the format (over 8 bits or over 32 bits) of the dates to be associated with the received messages for their dating, an A field 72 for authorizing or not the modification of the content of the control register 21 upon running of a particular instruction descriptor, and a C field 73 for authorizing the specific modification by reversing the low-significance bit of the base address field 50 upon occurrence of particular events.

The reading of the control register 21 associated with the current reception channel makes it possible to determine, in particular, the mode of storage of the message, namely either in ring mode according to which the message, regardless of its tag, is stored in the memory 3, in a waiting file called "ring" whose address is defined by the channel number, or in label mode according to which the message is stored and processed as a function of its label 45.

A ring is a storage area of predetermined size which is divided into two blocks of equal sizes and in which the messages are stored as they arrive.

At stage 83, the sequencer 11 determines the address in the memory 3 or 4 of the descriptor associated with the message by concatenating the base address field 50 provided by the control register 21 of the channel by which the message was received, with the channel number in ring mode or with the label 45 of the message in frame mode, then it reads the descriptor at the address thus determined (stage 84).

Figure 5:
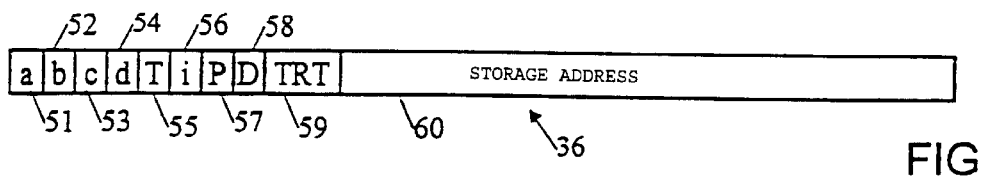
FIG. 5 shows the format of a preprocessing descriptor in accordance with the method according to the invention.

As represented in FIG. 5, a preprocessing descriptor 36 is a word including:

a field for defining the storage address of the message 35 in the memory 3, a TRT field 59 containing a processing code to be applied to the message, a D field 58 indicating whether or not the sequencer 11 is to date each message, a P field 57 indicating whether or not the sequencer 11 is to check the parity of each message, an i field 56 indicating whether the sequencer 11 is to trigger an interrupt under certain conditions, for example, in ring mode, at each message arrival or when a block of the storage area is full, a T field 55 indicating whether or not the sequencer 11 is to sort the messages as a function of the content of their SDI field 44, and four fields 51 to 54 indicating the values of the SSM fields 42 of the messages 35 that the sequencer 11 is to reject.

When the TRT field 59 is equal to a certain predefined value, for example 2, the descriptor is an instruction descriptor.

At stage 85, the sequencer 11 reads the TRT field 59 in order to determine whether the descriptor is of the preprocessing or instruction type. If it is an instruction descriptor, the sequencer 11 runs the stages 109 and 110 described below. If, however, it is a preprocessing descriptor, the sequencer determines at stage 86 the processing mode, ring or label, with the aid of the field 48 of the channel control register 21.

In ring mode, the storage address field 60 of the descriptor 36 is divided into two parts, namely a high-significance part containing the address of the storage area and a low-significance part containing the current storage address of a message in the storage area, this low-significance part being incremented each time a message is written.

Furthermore, in this mode, the TRT field 59 has a predefined value, for example 0.

In ring mode, at stage 87, the sequencer 11 calculates the storage address of the message 35 with the aid of the storage address provided by the descriptor 36 read at the preceding stage, and writes the message at the address thus calculated (stage 88).

If the value of the D field 58 of the descriptor indicates that it is necessary to date the message (stage 89), it reads the register 33 giving the current date and writes the read value at the address which follows the one where the message has been written (stage 90). At the following stage 91, it updates the low-significance part of the storage address field 60 of the descriptor, so as to identify the address which follows the last word which has just been written, that is to say by incrementing it by 2 or by 1 according to whether or not it dated the message. At stage 93, if the value of the P field 57 indicates that it is necessary to check the parity of the message, it verifies this parity on the basis of the bits of the message and updates the P bit 41 of the stored message (stage 94), so as to indicate whether or not it has found the parity to be correct.

When a block of the ring has been completely filled, the low-significance part of the field 60 having changed by binary incrementation from a maximum value to a minimum value, the low-significance bit of the field 50 of the control register 21 is reversed so as to point to another descriptor 36, and hence another storage block.

It should be noted that this reversal is authorized by particular coding of the field 73 of the control register 21.

In label mode, several different processing operations may be indicated by the TRT field 59 of the descriptor 36 (stage 97), namely a simple type of processing operation according to which the message is to be simply written at the storage address indicated by the descriptor, a frame-type processing operation according to which all the messages 35 having the same label are to be written to a waiting file in the memory 3, and a formatted-type processing operation in which the message 35 also undergoes formatting operations. In this last case, the sequencer goes to stage 111 shown in FIG. 9.

In the simple processing operation, at stage 104, the sequencer 11 determines whether the message is to be rejected. This is the case if the P field 57 of the descriptor 36 indicates that it is necessary to test the parity and that the parity of the message is incorrect, or if the fields 51 to 54 of the descriptor indicate that it is necessary to reject the messages whose SSM field 42 has certain values and if this field in the message actually has one of these values.

If the message 35 is rejected and if the E field 47 of the control register 21 so authorizes, the machine generates an error interrupt in the file 31.

If the message is not rejected, the sequencer 11 calculates the storage address of the message by concatenating the base address 50 provided by the control register 21 associated with the reception channel of the message, the label field 45 of the message, and, if the T field 55 of the descriptor 36 of the message so indicates, the SDI field 44 (stage 105) If the message is to be sorted according to the value of its SDI field 44, the storage address of the message must also take into account the D field 58 of the descriptor if it indicates that the message is to be dated, and the D field 46 of the control register 21 if it indicates that the messages are to be dated over a 32-bit word.

The sequencer 11 then writes the message at the address thus calculated (stage 106).

If the message is to be dated over 8 bits, the 8 low-significance bits of the register 33 replace the label field 45 in the stored message. However, if the message is to be dated over 32 bits, the full value of the register 33 is written in memory 3 at the address which follows the one which was calculated at stage 105.

If the i field 56 so indicates, the sequencer 11 generates an interrupt in the file 31 in order to indicate to the microprocessor 2 that a message of the type which was just processed has been received, on condition that this generation is validated by the field 49 of the control register 21.

As in the case of the simple processing, the frame processing takes place in a similar way from stage 98 to stage 102. There is, however, a difference in the calculation of the storage address of the message in the memory 3 because, on the one hand, in this mode it is not possible to sort by SDI (field 44 of the message), and, on the other, the storage address 60 in the descriptor 36 of the message has to be updated following the writing of the message and possibly the date (stage 103).

Figure 7:
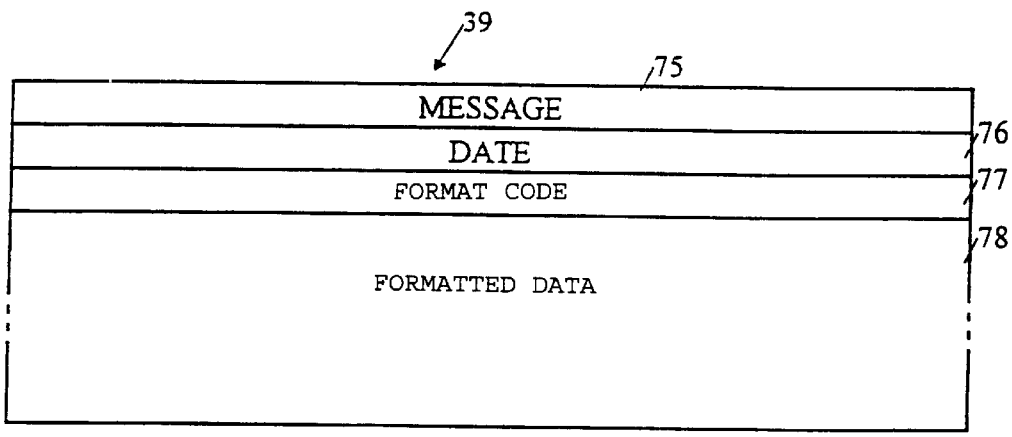
FIG. 7 shows the format of a reception block in which the received message and the information items, extracted from the message and formatted, are written.
Figure 9:
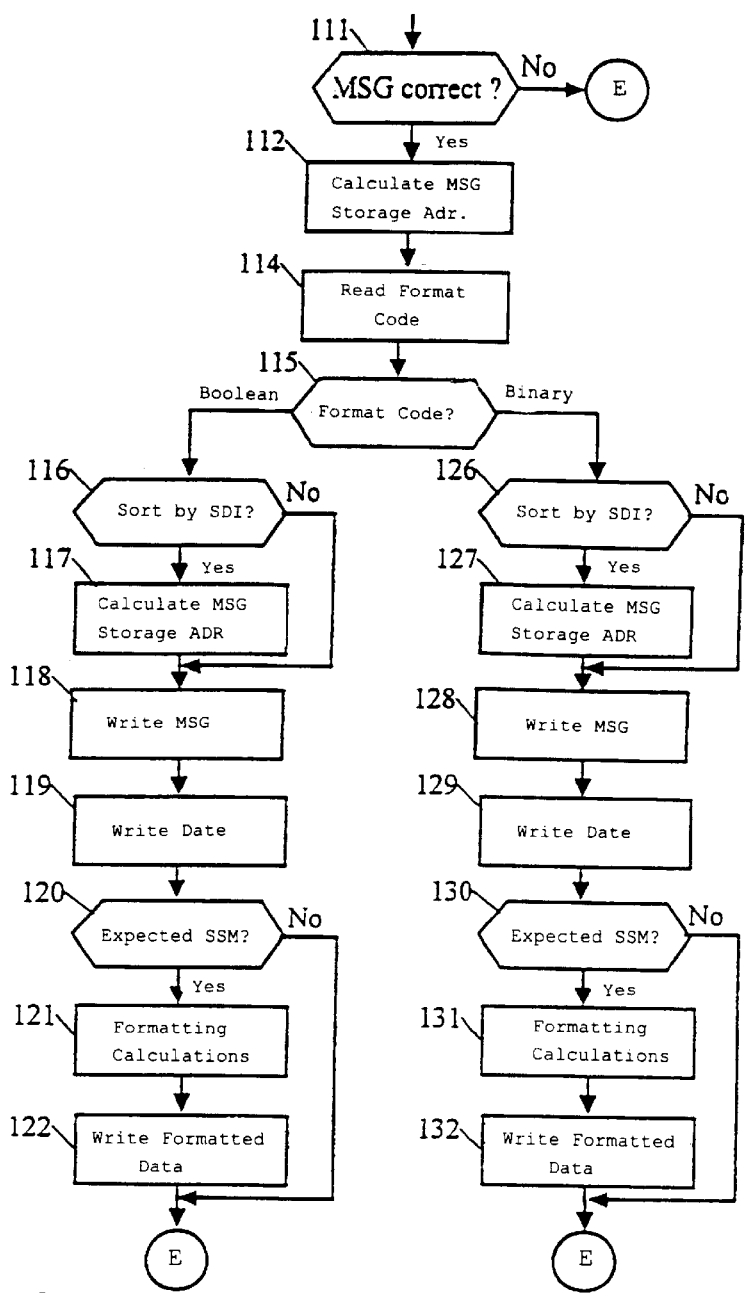

In FIG. 9, the first stages 111 and 112 of the formatted processing operation are similar to stages 104, 105 and 98, 99 of the other processing operations of the label mode. In this processing operation, however, the message is stored in a block 39 of data loaded into the memory 3 upon initialization of the system, this block having a particular structure like the one shown in FIG. 7.

This block comprises:
- an area 75 intended to receive the message as it was received,
- an area 76 intended to receive the expiration date of the datum, this date being calculated by taking the sum of the reception date of the message and a constant over 8 bits representing the refresh constraint or duration of validity of the message,
- an area 77 containing a format code preloaded upon initialization of the memory 3 and defining the operations of formatting the message as well as the refresh constraint constant, and
- an area 78 of one or more words which is intended to receive the formatted data.

Figure 6A:
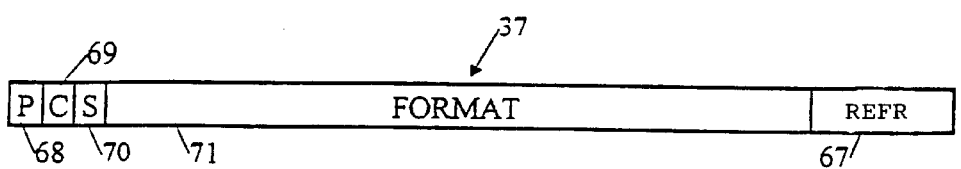
FIGS. 6a and 6b show the format of formatting codes used for the formatting of the information items contained in the received messages.

FIG. 6a shows the general structure of the format code. In this figure, the format code 37 comprises:
- a field 67 giving the value of the refresh constraint,
- a field 71 defining the formatting parameters,
- a field 70 specifying whether, in the case of sorting by SDI, the format code depends on the value of the SDI field 44 of the received message 35,
- a field 69 at the value 0 or 1 in order to indicate respectively that the formatting operation to be applied is formatting of the binary or boolean type, and
- a parity bit 68 in order to give the format code an odd parity.

In the case of boolean-type formatting, the field 71 of the format code provides the position in the received message 35 of the bits to be converted to boolean, in accordance with the TRUE and FALSE values provided by the registers 27, 28.

Figure 6B:
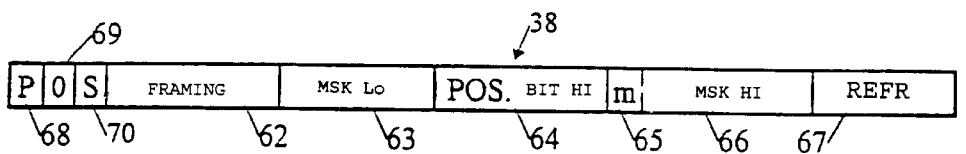

In the case of binary-type formatting, the field 71 of the format code 38 shown in FIG. 6b comprises:

- a field 66 giving the number of bits to be masked at low significance,
- a field 65 giving the value of the mask 1 or 0 to be applied at low significance,
- a field 64 giving the position of the significant bit of high significance or sign in the received message 35,
- a field 63 indicating the processing of the bits beyond the high-significance bit whose position is defined by the field 64, namely masking to 0 or 1, or extension of the sign, and
- a field 62 containing a framing code defining the position of the bits of the received message which are optionally kept in the word resulting from the formatting.

Once the address of the storage block 39 of the message is calculated at stage 112, the sequencer 11 reads the format code 77 from the block 39 while checking its parity (stage 114) and if this parity is not odd the processing is not continued. In the converse case, the sequencer reads the field 55 of the descriptor 36 in order to determine whether or not sorting by SDI is to be carried out, and if such sorting is to be carried out, it also reads the field 70 of the format code which indicates whether or not the format code depends on the value of the SDI field 44 of the message.

According to the value of the field 69 of this code, the sequencer 11 then activates the formatting operation of the boolean or binary type (stage 115).

At stage 116 or 126, if the field 55 of the descriptor 36 indicates that sorting by SDI is to be carried out, the sequencer calculates the address where the message is to be rewritten, this address being equal to the block's address calculated beforehand, to which the value of the SDI field 44 multiplied by the size of the block is added (stage 117 or 127). At stage 118 or 128, the sequencer 11 then writes the received message in a data block 39, at the last calculated address, either the one calculated at stage 112 or the one calculated at stage 117 or 127. If the format code depends on the value of the SDI field 44 of the message, the sequencer again reads the format code 77 of the block 39 where it has just written the message 35.

If the field 58 of the message descriptor 36 indicates that it is necessary to date the message, the sequencer 11 calculates the expiration date of the message by adding, to the current date over 32 bits read from the register 33, the value of the refresh constraint of the last format code read 77, and writes this date in the date field 76 of the current data block 39, that is to say in the block where the received message was stored for the last time (stage 119 or 129).

In both formatting operations, if one of the fields 51 to 54 of the descriptor 36 of the message has the value 1 and if the SSM field 42 of the message 35 has a value which does not correspond to the one defined by these fields 51 to 54, the message is rejected, that is to say the processing of the message is not continued (stages 120 or 130).

It should be noted that a message is written in the reception data block which is associated with it and dated, even if it is rejected because of the value of its SSM field 42, which allows the handling processor to verify that the message transmitted at a correct rate even though it is not valid.

At stages 121 and 131, the sequencer carries out the operations of formatting the useful information items 43 of the message 35, as they are defined by the last format code 37 read, and writes the formatted data in the field 78 of the data block 39 (stage 122 or 132).

The boolean formatting operation (stage 121) consists in reading the bits of the field 43 of the received message 35 which are indicated by the field 71 of the last format code read, in converting them respectively into a boolean TRUE or FALSE as a function of their value 1 or 0, in accordance with the values stored in the registers 27, 28, and in writing the resulting value in the data field 78 of the current data block (stage 122).

In this case, the data field 78 advantageously comprises one 32-bit word per bit of the received message 35, each 32-bit word corresponding respectively to one bit of the received message, and being intended to receive the value of the boolean corresponding to the bit of equal rank in the received message.

The binary formatting operation (stage 131) consists firstly in constructing a 32-bit masking word whose n low-significance bits are active, n being provided by the field 66 of the format code 38, and in applying this masking word to the 32-bit message 35, by replacing the positions marked by the masking word with the value of the field 65 of the format code. This processing operation then consists in constructing a 64-bit word comprising at high significance the result of the masking, and at low significance a 32-bit word whose bits are equal to the masking value provided by the field 65 of the format code 38. The following formatting operation consists in constructing a 95-bit word comprising at low significance the 64-bit word resulting from the preceding operation, whose high-significance bits, starting from the significant bit indicated by the field 64 of the format code 38, have been forced to the value indicated by the field 63 of the format code, namely 0, 1 or the value of the significant bit, and at high significance a word consisting of 31 bits at the value indicated by the field 63 of the format code. The formatting operation ends with an operation which consists in selecting 32 consecutive bits in the 95-bit word thus formed, in accordance with the framing specification provided by the field 62 of the formatting code, the value of this specification indicating the position of the low-significance bit of the resulting word to be taken into account in the 95-bit word.

Hence, for example, if the field 66 has the value 0, the field 64 has the value 31 and the field 62 has the value 32, the result of the formatting corresponds to the received message. If the fields 66 and 64 have the value i−1 and the field 62 has the value 32, the resulting value comprises all its bits at the value indicated by the field 63 except for the i bit of the received message 35. If the field 64 has the value i−1, the field 62 has the value 63 and the field 63 has the value 2 (extension of the sign), the formatting is equivalent to a conversion of the i bit of the received message 35 into boolean (all the bits of the resulting word are at the value of the i bit).

As for the "simple" and "frame" processing operations, the sequencer 11 also generates interrupts in the interrupt waiting file 31, as a function of the value of the fields 47 and 49 of the control register 21 of the reception channel of the message, and 56 of the descriptor 36 of the message, and the errors detected and the processing operations carried out.

If, at stage 85, the sequencer 11 has read an instruction descriptor, the sequencer 11 decodes the instruction contained in the descriptor, and runs it (stage 109).

It is possible to stipulate that the functionalities offered by the running of sequences of instruction descriptors be possible only after a validation carried out by the microprocessor 2 by writing in a register 23 of the internal memory 13.

Figure 10:
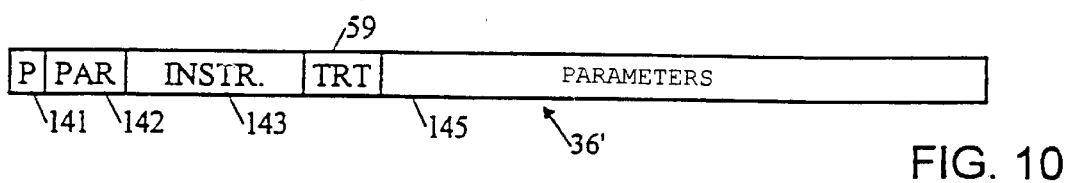
FIG. 10 shows the format of an instruction descriptor in accordance with the method according to the invention.

FIG. 10 shows the structure of an instruction descriptor 36'. In this figure, such a descriptor comprises:

a P field 141 whose value is determined so as to give the descriptor word an odd parity, a field 143 whose value denotes the type of instruction to be carried out, the TRT field 59 which is at the value assigned to the instruction descriptors, for example 2, and two fields 142 and 145 containing, if necessary, the parameters to be associated with the type of instruction indicated by the field 143.

The field 143 may, for example, take one of the following predefined values:

0 and 1 for instructions to modify, respectively, the channel control register 21 permanently and temporarily, the fields 142 and 145 then providing the values of the various fields of the register 21;

2 for an instruction to compare the writing pointer in the case of the ring and frame-type label modes, the fields 142 and 145 then containing the reference value for the comparison and specifying the action to be carried out in the event that the comparison reveals an identity, namely resetting the writing pointer to zero, reversing the low-significance bit of the field 50 of the control register 21 if the value of the field 73 of this register so authorizes, and possibly generating an interrupt;

3 in order to indicate that the fields 142 and 145 contain a mask to be applied to the data field 43 of the received message with a view to a comparison of the masked content of the message with a reference value;

4 to 7 for instructions to compare the received message with a reference value provided by the fields 142 and 145, possibly by using the mask provided in the descriptor read beforehand (field 143 equal to 3), with or without generation of an interrupt in case of equality;

8 to 11 for branch instructions, the fields 142 and 145 then providing, according to the case, the branch address or the high-significance part of the branch address, to be supplemented with the label 45 of the message and possibly the SDI 44 and SSM 42 fields of the message;

12 for an instruction to branch to a descriptor specific to the ring mode, which will hereafter be interpreted according to this mode; the word read following the address contained in the parameter of the instruction must then necessarily be a ring descriptor or else the sequence is abandoned and the message is not processed;

13 for an instruction to modify the label 45, and possibly SDI 44 field of the received message, the field 145 then providing the new values of the label and SDI fields; and 14 for an extension to compare with the label 45 and SDI 44 fields of the received message, the fields 142 and 145 then containing the values of mask and reference for comparison for the fields 44 and 45 of the message, this instruction being intended to be placed immediately before a comparison instruction.

It will be noted that for the instructions to modify the control register 21 to be carried out, it is appropriate for this register to be declared modifiable by appropriate coding of the field 72.

The instruction to modify the channel control register 21 temporarily makes it possible to modify the content of the register solely for the processing of the current message. At the end of the processing of the message, this register hence returns to the value which it had before.

The sequences of instruction descriptors are limited, for example, to blocks of 16 consecutive addresses following a base address which is a multiple of 16. It is, however, possible to start a sequence at an address which is not a multiple of 16. In the absence of branch instructions, and without comparison instructions, the sequencer 11 reads (stage 110) and runs (stage 109) successively the instructions contained in the sequence, incrementing by 1 (modulo 16) the current address to be read after the running of each instruction, this having necessarily to end at a preprocessing descriptor or at a code for branching to such a descriptor.

Following each reading of a descriptor of the sequence, the sequencer 11 starts by determining the type of descriptor with the aid of the field 59. If the value of this field indicates a preprocessing descriptor, the sequencer 11 runs the operations described above starting from stage 86.

If the value of the field 59 indicates an instruction descriptor 36', the sequencer 11 checks the value of the field 141, and if this value is not in agreement, the corresponding instruction is not run by the sequencer 11 and the instruction sequence is abandoned and the received message is not processed. It then checks whether the value of the field 143 corresponds to one of the predefined instructions. If this is not the case, the instruction sequence is abandoned and the received message is not processed.

In the case of a comparison instruction, if the comparison does not reveal an identity, the sequencer reads the descriptor located at the following address. In the converse case, it reads the descriptor located at the current address plus 2 (modulo 16).

In the case of a comparison extension instruction, indicated by an instruction descriptor field 143 equal to 14, if the comparison reveals an identity, the sequencer reads the descriptor located at the following address, which normally contains a comparison instruction. In the converse case, it reads the descriptor located at the current address plus 2 (modulo 16), which contains the instruction to be run if the second comparison is not verified. In this way, both of the two comparison instructions share the same address corresponding to the unsatisfied condition. Furthermore, if the condition extension is verified, the comparison is run, which makes it possible to obtain a logical AND on the simultaneous fulfilment of the two conditions.

It can be seen from the description above that the method according to the invention allows relatively complex processing operations to be defined in a dynamically configurable way.

What is claimed is:

1. A method for the reception and preprocessing of digital messages available on at least one reception channel of a digital bus, with a view to the use of the messages by a handling processor for which the messages are intended, each message comprising usefull information items and a tag identifying these useful information items, comprising:

associating the tag of each message capable of being received with a descriptor relating to operations to be carried out by a handling processor for which the message in question is intended, storing the descriptor in a memory at an address calculated with the aid of the tag of the corresponding message, and upon reception of a message, reading of the tag of the received message, calculating the descriptor's address obtained with the aid of the tag, reading in memory of the descriptor at the address thus calculated, and running of the operations indicated by the descriptor, wherein the descriptors belong to various categories, including a category of preprocessing descriptors, each preprocessing descriptor containing all the parameters defining the preprocessing operations to be applied to the associated message, and a category of instruction descriptors corresponding to an instruction to modify the control parameters of a reception channel, to an instruction for branching, conditional or unconditional, to another descriptor, to an instruction to compare the information items contained in the associated message with reference values or to an instruction to compare pointers for writing in data structures of a ring or frame type with reference values.

2. The method according to claim 1, wherein the modification of the control parameters in response to an instruction descriptor is effective only if the modification is authorized beforehand by appropriate coding of a control parameter.

3. The method according to claim 1, wherein when the instruction descriptors are run in sequence following branches, the instruction descriptors end with a preprocessing descriptor.

4. The method according to claim 1, wherein each instruction descriptor comprises a first field, whose value is determined so as to give the content of the descriptor an odd parity, a second field, whose value indicates the type of instruction to be carried out, a third field, whose value corresponds to a value assigned to the instruction descriptors, and a fourth field containing, if necessary, the parameters to be associated with the type of instruction indicated by the second field.

5. The method according to claim 4, further comprising:
checking the value of the first field each time an instruction descriptor is read, and if the check reveals a nonconformity, the instruction indicated by the descriptor is not run and the received message is not processed.

6. The method according to claim 4, further comprising:
checking the value of the second field each time an instruction descriptor is read, and if the value of the second field does not correspond to one of the predefined instructions, the processing of the instruction descriptor is abandoned and the received message is not processed.

7. The method according to claim 4, wherein the second field of an instruction descriptor takes a first value in order to define an instruction to branch to a preprocessing descriptor specific to a predetermined processing mode, the fourth field of the instruction descriptor then containing the address of the specific preprocessing descriptor, and if the address associated with the branch instruction is not an address of a preprocessing descriptor specific to the predetermined processing mode, the processing of the instruction descriptor is abandoned and the received message is not processed.

8. The method according to claim 1, wherein each preprocessing descriptor comprises information items defining a memory address of a data block with predefined structure, in which the corresponding message is to be stored.

9. The method according to claim 8, wherein the data block comprises a formatting code defining formatting operations to be applied to the information items contained in the message, so as to make these information items directly usable by the handling processor.

10. The method according to claim 9, further comprising:
applying a boolean or binary formatting operation as a function of the formatting information items contained in the data block, the boolean formatting operation consisting in converting each bit of the message indicated by the format code into a boolean variable that is stored following the message in the data block, the binary formatting operation consisting in masking, to certain values indicated by the formatting code, the low and high significant bits based on respective ranks indicated by the formatting code, and
framing the word thus obtained with the aid of a framing information item also provided by the formatting code.

11. The method according to claim 9, wherein the formatting code comprises a field giving a refresh constraint value to be associated with the information items contained in the corresponding message, a field indicating the type of formatting operation, binary or boolean, to be applied, a field defining the formatting parameters, and a parity bit for giving the formatting code an odd parity, the parity of the formatting code being checked each time the formatting code is read, the processing corresponding to the formatting code not being carried out if the parity of the formatting code is incorrect.

12. The method according to claim 9, wherein the preprocessing descriptor of a message comprises a field indicating whether it is necessary to store the message at an address which depends on an information item contained in the message, the formatting code further comprising a field specifying whether the formatting code depends on the value of the information item.

13. The method according to claim 8, wherein each preprocessing descriptor of a message indicates whether it is necessary to save the reception date of the associated message, the method further comprising storing the message at the address indicated by the preprocessing descriptor, and if the descriptor so indicates, storing the reception date of the message following the message.

14. The method according to claim 1, wherein the handling processor is connected to a plurality of channels for receiving digital messages, the method further comprising:
associating each reception channel with a channel control register indicating the address of the area containing the descriptors of the messages configured to be transmitted by this channel, as well as general parameters defining the preprocessing operations to be applied to these messages, the channel control registers being stored in memory at predefined respective addresses,
receiving a message by a channel triggering the reading of the control register of the channel, and
calculating the address of the descriptor of the message with the aid of the tag of the message and the address of the area with the descriptors of the messages, which is read from the control register of the channel.

15. The method according to claim 1, wherein each preprocessing descriptor of a message comprises information items for sorting as a function of the content of the message, the method further comprising the rejection of a received message if the content of the message corresponds to the sorting information items contained in the preprocessing descriptor that is associated with the message.

16. A device for carrying out the method according to claim 1, comprising a sequencer machine comprising means for running the operations of receiving, storing and preprocessing the received messages, as well as the instruction sequences associated with the received messages.

17. The device according to claim 16, comprising an internal memory, accessible from the outside, where the received messages awaiting preprocessing and general parameters defining the preprocessing operations are stored, the descriptors and the data blocks for storing the messages being located in an external memory.

* * * * *